(No Model.)
H. A. MAJEWSKI & W. BEYENBACH.
PROCESS OF MANUFACTURING ARTIFICIAL MARBLE.
No. 508,731. Patented Nov. 14, 1893.
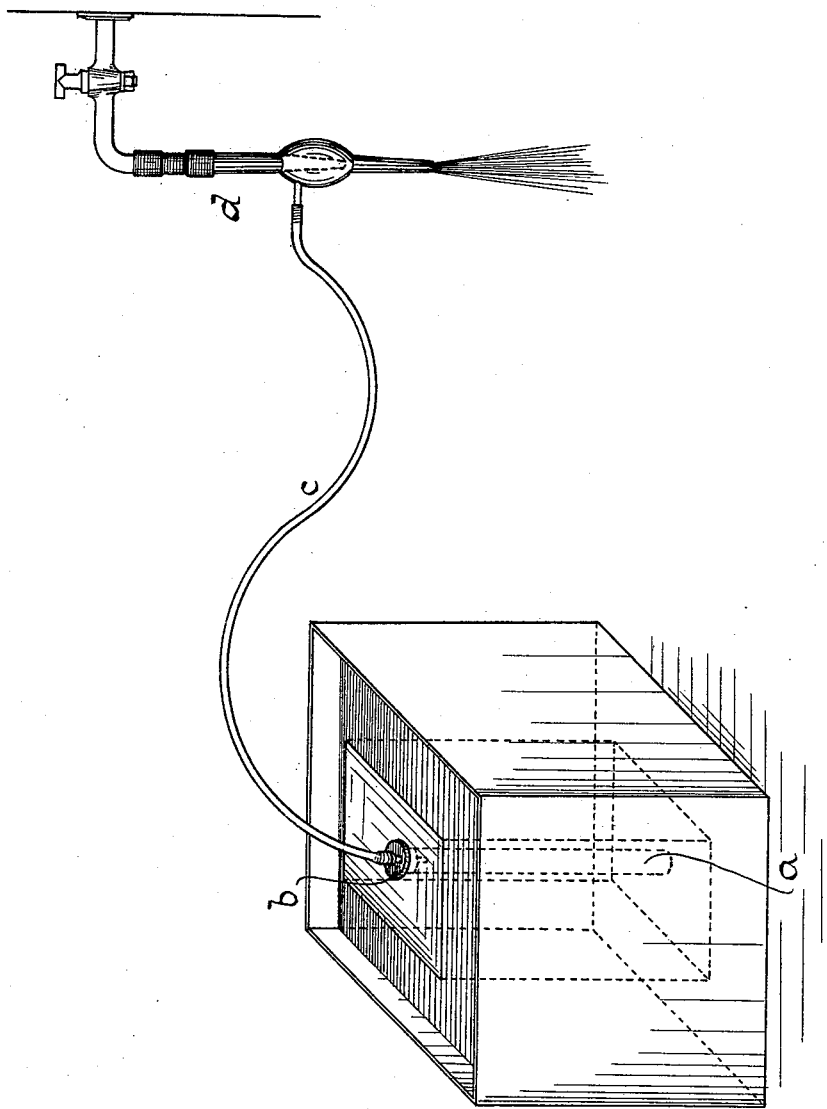
Witnesses:
Inventors:

UNITED STATES PATENT OFFICE.

HUGO ADALBERT MAJEWSKI AND WILHELM BEYENBACH, OF BERLIN, GERMANY.

PROCESS OF MANUFACTURING ARTIFICIAL MARBLE.

SPECIFICATION forming part of Letters Patent No. 508,731, dated November 14, 1893.

Application filed June 4, 1892. Serial No. 435,562. (No specimens.)

*To all whom it may concern:*

Be it known that we, HUGO ADALBERT MAJEWSKI, a subject of the King of Prussia, and WILHELM BEYENBACH, a subject of the Grand Duke of Hesse, both residing at Berlin, Prussia, German Empire, have invented new and useful Improvements in Processes of Manufacturing Artificial Marble, of which the following is a specification.

Gypsum or plaster, freed from moisture and burned, may by impregnation in solutions of quickly crystallizing salts, be hardened and colored, so that it acquires a very attractive appearance. This fact, borne out by experiment, has not, however, been taken advantage of to any considerable extent, in the manufacture of stone for the purposes of making therefrom statuary and the like, owing to certain difficulties, which have hitherto baffled the attempts made in that direction. The main cause of the failures experienced resides in the fact, that the salt solutions required for saturating gypsum, fail to penetrate the stone to a sufficient depth, since they become crystallized almost at the surface of the block and thereby themselves close up the pores, through which they might otherwise reach the interior. It has been for some time our endeavor to overcome this drawback, and this led us to the discovery of a liquid, which, while facilitating the admission of the readily crystallizing salts to the very core of the stone, does not itself produce any effect on the latter, though it is capable of combining with the salts subsequently used for saturation in such a manner, as to render the stone proof against atmospheric influences and dampness. Thus, a concentrated solution of sulphite of potassium ($K_2SO_3$) in the present process acts as a vehicle for the solutions of salts subsequently to be conveyed into the body of the stone; and it performs this function by enveloping, as it were, the molecules of the sulphate of lime. Besides, as this solution of sulphite of potassium is slow in crystallizing, it counteracts the tendency of the solutions of salts, subsequently employed, to deposit too quickly their crystals in the pores. Thus the salt solutions will freely penetrate the stone, so long as the liquid acting as a vehicle does not itself combine with the salts and become crystallized. It will be understood, that to attain this object the stone should not be allowed to become completely saturated with the liquid vehicle, since, if the pores are entirely filled up, the inward suction or capillary action naturally ceases. It is therefore sufficient for the stone to draw in just a slight quantity of the said liquid vehicle. In the case of large sized blocks, however, natural suction will not be found sufficient to carry the solutions into the interior of the stone, as owing to the slow capillary action, crystallization will generally set in too soon to permit a deep penetration of the solution. Capillarity ought therefore in this case to be assisted by suitable suction.

Without the liquid pore-opening medium or vehicle referred to, the salt solutions, capable of imparting to the stone the properties and color of marble, can hardly in any case sufficiently pervade the structure of the stone to accomplish the desired purpose.

The transformation of gypsum or plaster into marble-like artificial stone is therefore carried out in practice substantially as follows: A block of gypsum of comparatively old formation is roughly hewn or cut to the desired shape, and then from seventy to eighty per cent. of the moisture it contains is extracted. The material thus practically freed from moisture is next placed in a bath consisting of a concentrated solution of sulphite of potash, a small quantity of which it is allowed to absorb, after which it is left to dry at the surface. The stone is now in condition to freely absorb salt solutions adapted to harden and color the same. Any of the solutions commonly employed for this purpose may be employed, the sulphates, chromates and cyanides being preferred. Of these latter salts the following may be named as examples, viz:—aluminium sulphate, alum, sulphate of zinc, potassium ferric cyanide and chromate of potassium. Articles of but small thickness are simply immersed in the desired solutions. Within twenty-four hours the gypsum will be seen to alter its appearance, when it may be placed in a well ventilated room heated to about 30° centigrade until the crystallization is completed. In the case of articles of considerable thickness, however, the preliminary suction process above referred to is preferably carried out as follows, reference being had to the annexed drawing which represents a perspective view of the apparatus employed.

The stone is formed with a longitudinal bore $a$ extending to near its bottom and then placed into the baths of the liquid vehicle or the crystallizing solutions, as the case may be, in such a manner, that the liquid only acts upon the outer surface of the stone. The bore is tightly closed by a cap $b$ connected by a hose $c$ with an ejector $d$, or other device for exhausting the bore; whereby the external liquid is forced inwardly under pressure. After crystallization the product obtained is capable, like natural stone, of being utilized for artistic work of any description.

This artificial marble will indeed fully answer the purpose of natural marble, over which it, moreover, has the advantage, that while it equals it in durability and beauty, it is less costly and is capable of being at all times adapted to the prevailing taste or fashion.

Having now particularly described and ascertained the nature of the said invention and in what manner the same is to be performed, we declare that what we claim is—

1. The herein described process for the manufacture of artificial marble, consisting in first treating the natural gypsum with a solution of sulphite of potassium, and then treating the same with a solution of alum or equivalent hardening agent.

2. The herein described process for the manufacture of artificial marble, consisting in first extracting the moisture from the natural gypsum, then treating the same, with a concentrated solution of sulphite of potassium, and finally treating the same with a solution of alum or equivalent hardening agent.

In testimony whereof we have signed our names to this specification in the presence of two subscribing witnesses.

HUGO ADALBERT MAJEWSKI.
WILHELM BEYENBACH.

Witnesses:
LUDWIG GLASER,
GUSTAV HÜLSMANN.